United States Patent [19]

Kato

[11] Patent Number: 5,214,518
[45] Date of Patent: May 25, 1993

[54] MULTIPLE VALUE IMAGE INPUT EQUIPMENT

[75] Inventor: Yasuo Kato, Saitama, Japan
[73] Assignee: Fuji Xerox Co., Ltd., Tokyo, Japan
[21] Appl. No.: 596,037
[22] Filed: Oct. 11, 1990

[30] Foreign Application Priority Data

Dec. 22, 1989 [JP] Japan .................. 1-331361
Dec. 22, 1989 [JP] Japan .................. 1-331362

[51] Int. Cl.$^5$ .................................. H04N 1/40
[52] U.S. Cl. .................. 358/448; 358/406; 358/446; 358/474
[58] Field of Search ........... 358/461, 464, 474, 475, 358/447, 448, 406, 445, 446, 455, 456, 80

[56] References Cited

U.S. PATENT DOCUMENTS

| | | | |
|---|---|---|---|
| 3,952,144 | 4/1976 | Kolker | 358/406 |
| 4,216,503 | 8/1980 | Wiggins | 358/446 |
| 4,427,998 | 1/1984 | Huntoon | 358/406 |
| 4,578,711 | 3/1986 | White et al. | 358/470 |
| 4,660,082 | 4/1987 | Tomohisa et al. | 358/446 |
| 4,723,174 | 2/1988 | Nishikawa et al. | 358/446 |
| 4,751,377 | 6/1988 | Ishizaka et al. | 358/406 |
| 4,974,098 | 11/1990 | Miyakawa et al. | 358/406 |
| 4,980,778 | 12/1990 | Wittman | 358/475 |

Primary Examiner—Edward L. Coles, Sr.
Assistant Examiner—Thomas L. Stoll
Attorney, Agent, or Firm—Finnegan, Henderson, Farabow, Garrett & Dunner

[57] ABSTRACT

A multiple value image input device corrects image data representing images from a document by scanning density indicating segments arranged along the main scanning direction of linear image sensor, each of the segments being set at a different optical density, and using the values obtained by such scanning to correct image data obtained by subsequent scanning of the document. The correction generally involves finding at least two values of the correction image data for each value of the image data, and applying to each value of the image data a function determined from the selected correction image data values. Further correction can be accomplished by scanning subsidiary density indicating segments and further correcting the image data based on results of scanning the second density reference area.

8 Claims, 14 Drawing Sheets

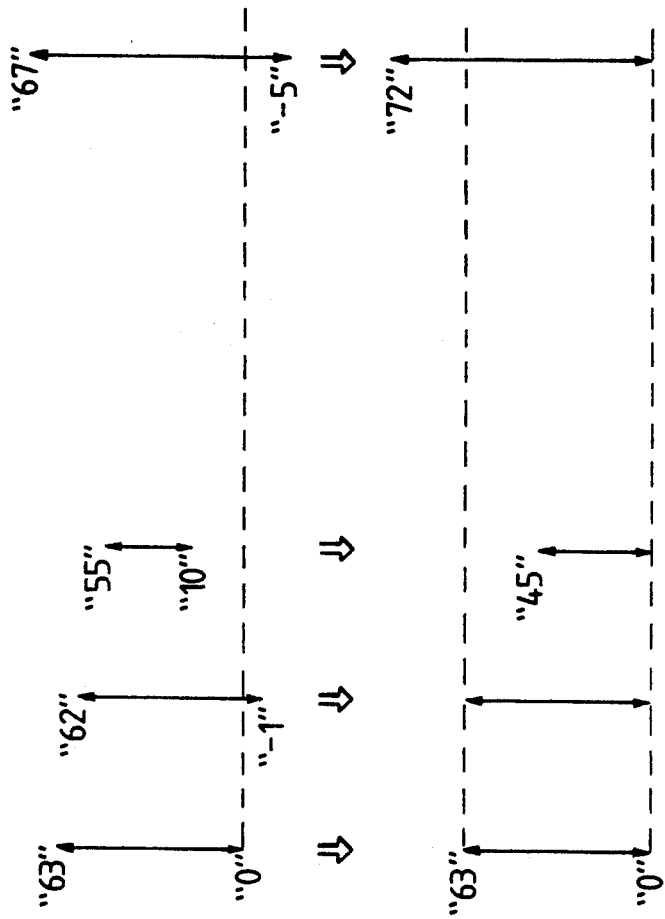
FIG. 1(a)
FIG. 1(b)
FIG. 1(c)
FIG. 1(d)

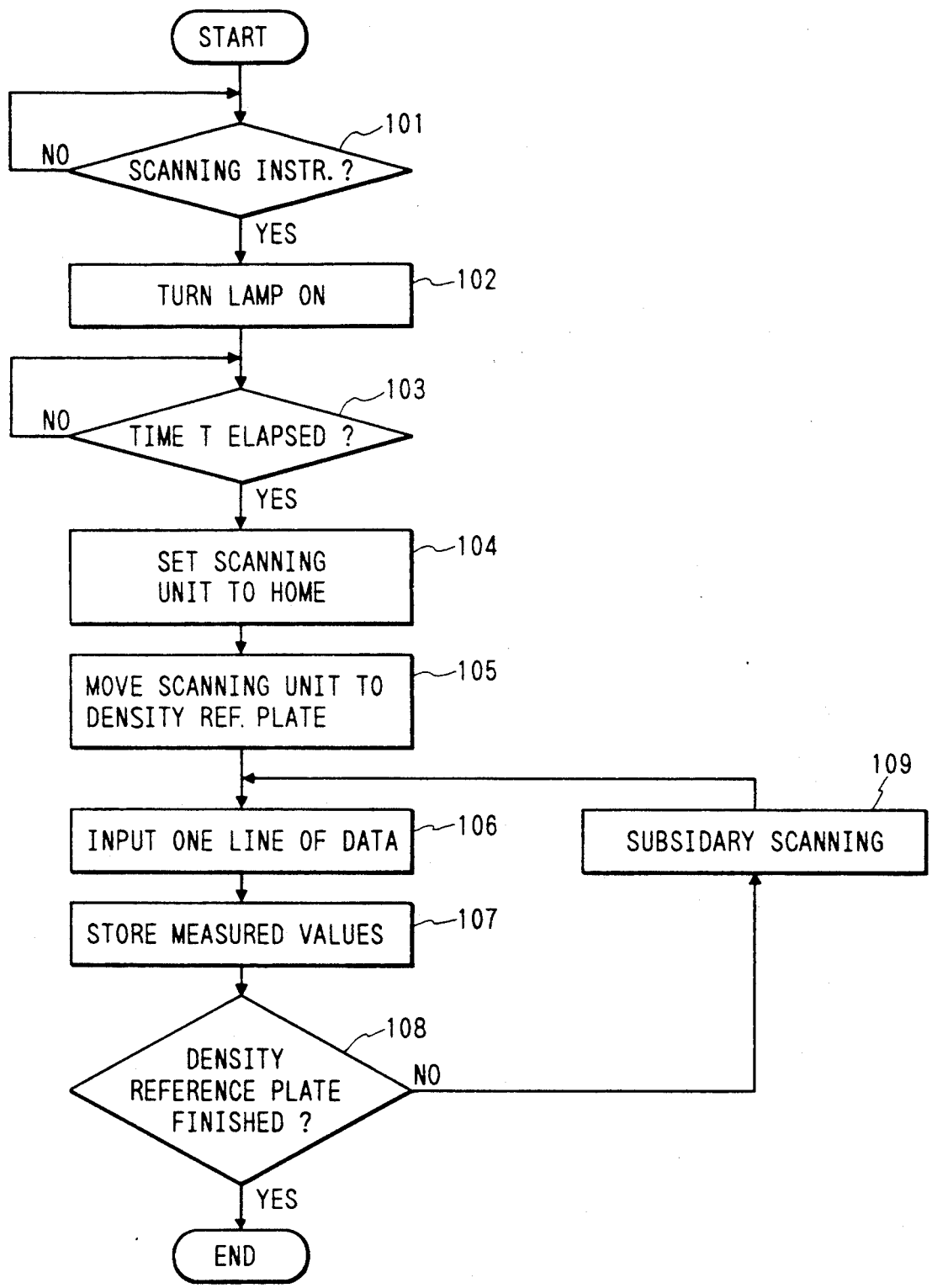

BEFORE CORRECTION   AFTER CORRECTION

"16" → $0 + \frac{15}{19} \times (16 + 3) = 15$

"10" → $0 + \frac{15}{19} \times (10 + 3) = 10$

"-3" → $0 + \frac{15}{19} \times (-3 + 3) = 0$

BEFORE CORRECTION   AFTER CORRECTION

BEFORE CORRECTION   AFTER CORRECTION

BEFORE CORRECTION   AFTER CORRECTION

FIG. 14
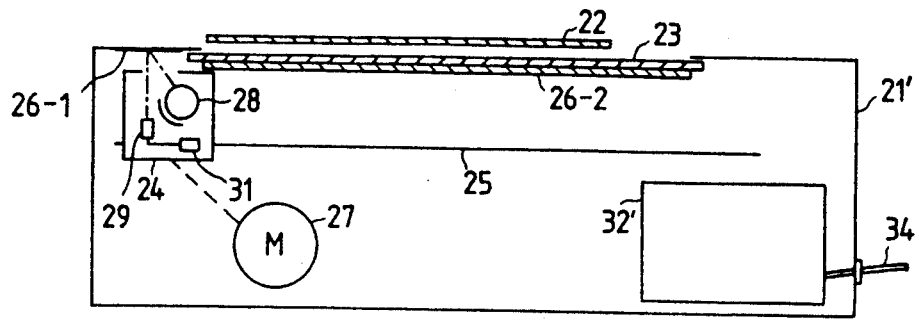
FIG. 17
| | |
|---|---|
| DATA ON DENSITY REFERENCE PLATE | 0 |
| | 5 |
| | 16 |
| | 24 |
| | 30 |
| | 37 |
| | 49 |
| | 56 |
| | 63 |
44A (MAXIMUM VALUE "50" / MINIMUM VALUE "10")
| DATA FOR ONE PAGE OF ORIGINAL SHEET | 34 |
|---|---|
| | 50 |
| | 10 |
| | 11 |
| | 11 |
| | 13 |
| | 12 |
| | 50 |
| | 49 |
| | 50 |
50
FIG. 20
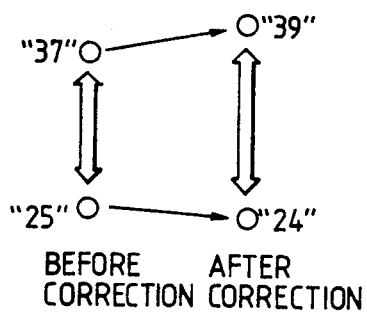
BEFORE CORRECTION    AFTER CORRECTION
FIG. 21
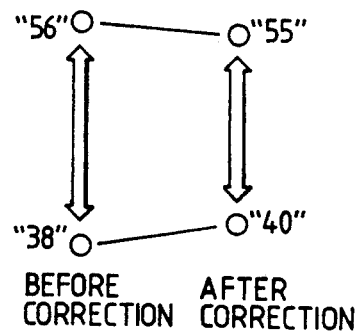
BEFORE CORRECTION    AFTER CORRECTION

FIG. 15
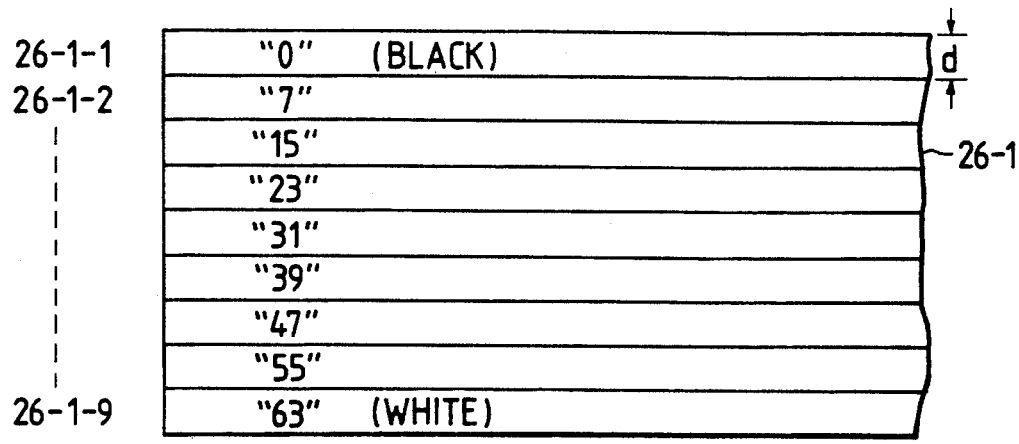
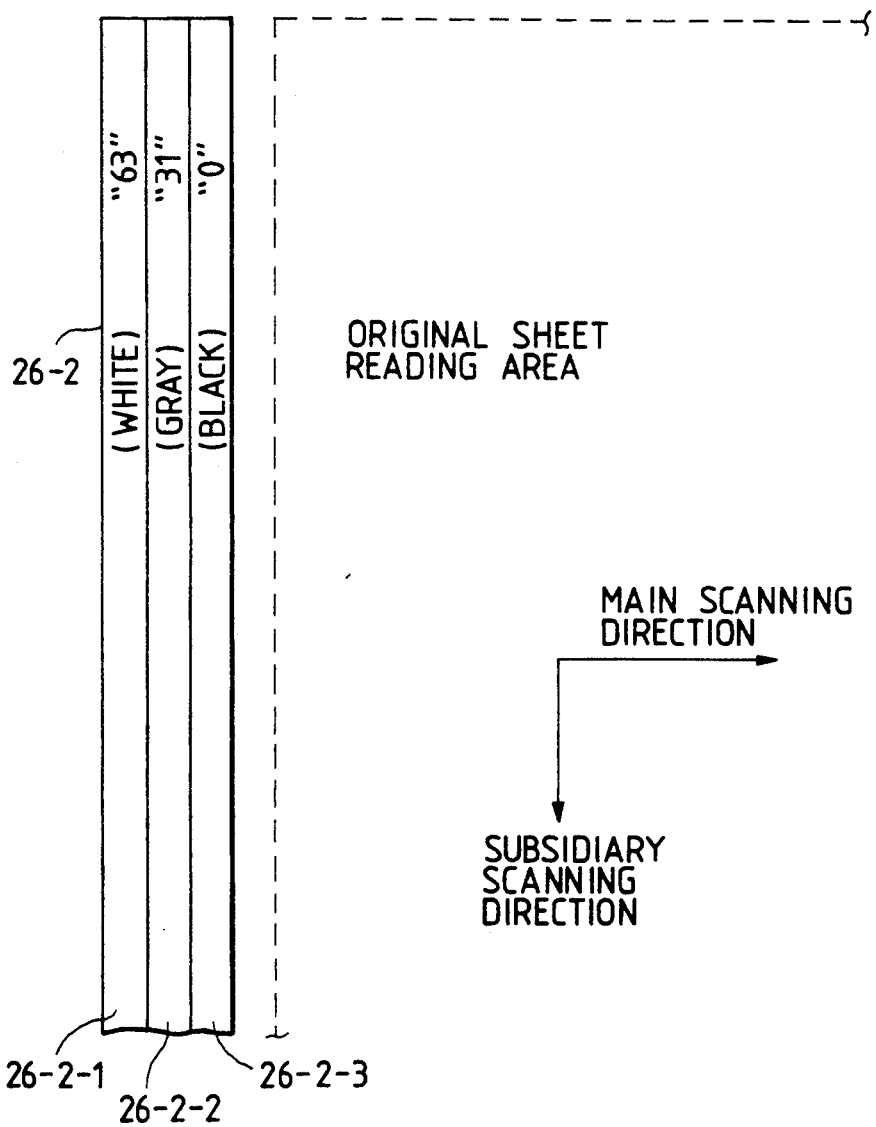

"24" → $7 + \frac{16}{19}(23-5) = 23$

"15" → $7 + \frac{16}{19}(15-5) = 15$

"5" → $7 + \frac{16}{19}(5-5) = 7$

MULTIPLE VALUE IMAGE INPUT EQUIPMENT

BACKGROUND OF THE INVENTION

The present invention relates to multiple value image input equipment which reads picture images having multiple chromatic gradation, for example, 64 chromatic grades or tonal ranges, and, more particularly, to such equipment which corrects inaccuracies in the expressions of such chromatic grades due to factors such as dispersion in the image sensor sensitivity.

Picture image processing with a computer system has become relatively widespread, as has the use of various picture image input equipment to read picture images, such as from photographs, for later processing. Most of the picture image input equipment currently in use converts input picture images into signals having binary values. This is typical of picture image input blocks in conventional facsimile machines. Even though that type of equipment can reproduce characters and line drawings, it cannot reproduce halftone images.

For halftone reproduction, recording processes such as the "Dither Process" have been developed. Along with the development of such processes, multiple value picture image input equipment, which is capable of representing scanned picture images in multiple value data, has become very important.

Conventional multiple value image input equipment applies shading correction to the picture image data obtained by scanning. This is needed because the levels of the signals output by the pixels are usually not in agreement even when reading the same part of an original sheet which should have the same optical density. The lack of agreement may be due to various factors such as a lack of uniform sensitivity of the individual pixels in the image sensor or a lack of uniformity in the quantity of light reflected from the original sheet.

To address this problem, some image input equipment is provided with a white plate or density-indicating block arranged in an area outside the reading area of the original sheet along the reading or main scanning direction of a linear image sensor. The sensor reads this white color plate before reading the original sheet. The equipment then sets the signal level so that the value of the signal read from the plate will agree with the value of the signal produced by each of the individual pixels when reading a white color. In this manner, conventional multiple value image input equipment attempts to adjust the perceived density of picture images.

Some multiple value image input equipment that processes picture images with 64 or 256 chromatic grades or tones experiences differences among the signal levels detected by the individual pixels. The differences most often occur at levels closest to the black color even if the reference point for the white color is adjusted to the same reference point. Because of this deviation, the individual pixels will not necessarily indicate the same value for identical optical density.

This point is illustrated in FIG. 1(a) through FIG. 1(d). FIG. 1(a) illustrates a white color or shading correction plate 11. White color plate 11 is read with a linear image sensor 12 shown in FIG. 1(b). Linear image sensor 12 is composed of n pixels labeled "1" to "n," each of which reads picture images pixel by pixel.

FIG. 1(c) represents an example of the dynamic ranges of four of the pixels, namely, the first, the third, the fifth, and the n-th pixels. In this example, the first pixel changes its signal level in 64 stages from "0" to "63" between its reading of the white color plate 11 and its reading of the darkest color. This pixel is in an ideal state and can be used for indicating the chromatic gradation at 64 levels, as shown in FIG. 1(d), without correction.

The third pixel, on the other hand, has a dynamic range from –"1" to "62." This pixel can be used for indicating chromatic gradation at the 64 levels from "0" to "63" by adding 1 to all the levels, as shown in FIG. 1(d), in order to adjust the "0" the signal level so that it is recorded when the white color plate 11 is read with this pixel. In other words, an additive correction is all that is required for the output from the third pixel in this example.

The fifth pixel, however, changes its signal level from "10" to "55" between its reading of the white color plate 11 and its reading of the darkest color. Therefore, even if a correction is made by subtracting "10" each from each of the levels, the chromatic gradation indicated by this pixel will only be from "0" to "45," as shown in FIG. 1(d). The result is that a black color is corrected to a gray color and a gray color is corrected to a brighter gray color. It is not possible to make a complete correction of the fifth pixel merely by adding.

The n-th pixel shows the opposite state. Its dynamic range is wider than the usual one, extending from "–5" to "67." Therefore, when "5" is added to each of the measured levels, the levels of the chromatic gradation will range from "0" to "72" the result is that the comparatively dark gray color will be corrected to black while the other gray shades will be corrected to darker gray shades. With this pixel as well, it is not possible to make a complete correction merely by adding an offset.

The preceding description assumes that the sensitivity of the individual pixels have uniform characteristics across the entire brightness spectrum. There are cases, however, in which the sensitivity of the individual pixels are not uniform for the individual brightness levels. For instance, some pixels have higher sensitivity to lower brightness levels on the chromatic gradation scale while other pixels have higher sensitivity at the higher brightness levels. This raises the possibility that the same gray color is sensed by different pixels to have different chromatic grades because the individual pixels with identical dynamic ranges respond differently to changes in brightness.

The preceding description has addressed the case in which corrections are made to compensate for the differences in the sensitivity of the individual pixels in a linear image sensor. The same applies for corrections made for the influences of other factors, such as the quantity of light.

FIG. 2 shows an example of the actual output levels from a typical multiple value image input device for which the density of the picture image data is represented as eight bit data, corresponding to 256 stages, and the output of the equipment is expressed in six bits, or 64 stages, with the solid line 14. The one-dot chain line 15 indicates ideal output characteristics. As FIG. 2 demonstrates, the output characteristics of a typical multiple value image input equipment are not simple because a variety of factors are at play. This situation renders it difficult to make proper corrections of chromatic gradation for the halftone reproduction.

In addition, fluctuations also occur in the output of each line in the direction of the subsidiary scanning with the linear image sensor. The causes of such fluctuations include the following factors:
  (i) changes in the distance between the equipment and the sheet due to vibrations of the scanning unit which moves the linear image sensor in the subsidiary scanning direction,
  (ii) changes in the light quantity accumulating time due to fluctuations in the speed of the scanning unit also caused by the vibrations of the scanning unit, and
  (iii) changes in the quantity of light from the light source subsequent scanning operations.

SUMMARY OF THE INVENTION

The present invention has been made in view of the above circumstances and has as an object a multiple value image input equipment capable correcting chromatic gradation to proper levels throughout the entire range even for pixels with different dynamic ranges.

Another object of the present invention is a multiple value image input equipment capable of making complementary corrections for differences among the individual pixels in their responses to changes in brightness, thereby keeping the output from all the pixels at proper levels of chromatic gradation.

Still another object of the present invention is multiple value image input equipment capable of making correcting chromatic gradation of picture images in the subsidiary as well as in the main scanning direction.

Additional objects and advantages of the invention will be set forth in part in the description which follows and in part will be obvious from the description or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the multiple value image input device of this invention for reading images from a document comprises: a linear image sensor including a plurality of pixels arranged along a main scanning direction for producing outputs representing optical density; a plurality of density indicating segments arranged along the main scanning direction of the linear image sensor, each of the segments being set at a different optical density; analog-digital conversion means, coupled to the image sensor, for converting outputs from the image sensor into image data; memory means, coupled to the analog-digital conversion means, for storing correction image data corresponding to the outputs for each pixel when the sensor is in a position to detect the density indicating segments; and multiple value image data correcting means for correcting image data obtained by each pixel when the sensor is in a position to detect optical density from the document. The multiple value image data correcting means includes means for finding, for each value of the image data, at least two values of the correction image data, and means for applying to each value of the image data a correction function determined from the selected correction image data values.

In one variation of the invention, a second density reference area includes a plurality of subsidiary density indicating segments arranged along a subsidiary scanning direction of the image sensor. The subsidiary density indicating segments are each set at a different prescribed density. In this variation, the linear image sensor reads lines and the subsidiary density indicating segments at the same time, from the document and the multiple value image data correcting means includes first correcting means for correcting the image data for each pixel at the time of reading the document on the basis of the stored pixel image data, thereby forming a first corrected image data, and second correcting means for further correcting first corrected image data for each of the lines of the document based on the image data obtained from reading the subsidiary density indicating segments.

The multiple value image input equipment just described attains the objects described above by a density reference plate arranged in the main scanning direction and, in other embodiments, in the subsidiary scanning direction. This enables the equipment to correct chromatic gradation.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings:

FIG. 1(a) is a diagram of a white color plate;

FIG. 1(b) is a diagram of a linear image sensor;

FIG. 1(c) is a diagram of possible dynamic ranges of pixels in the image sensor of FIG. 1(b);

FIG. 1(d) is a diagram of the dynamic ranges of FIG. 1(c) adjusted according to measurements made using the white plate shown in FIG. 1;

FIG. 6 is a flow chart of the operations for reading the density reference plate of FIG. 5;

FIG. 14 is a chart illustrating a schematic construction of the multiple value image input device of FIG. 13;

FIG. 15 is a magnified plane view illustrating portions of a first and second density reference plates in FIG. 14;

FIG. 17 is an example of the data stored in the memory device when the second preferred embodiment has completed its reading operations illustrated in FIG. 16;

FIG. 20 is a diagram illustrating the principle of correction with respect to a second area;

FIG. 21 is a diagram illustrating the principle of correction with respect to a third area;

DETAILED DESCRIPTION OF THE INVENTION

Figure 2:
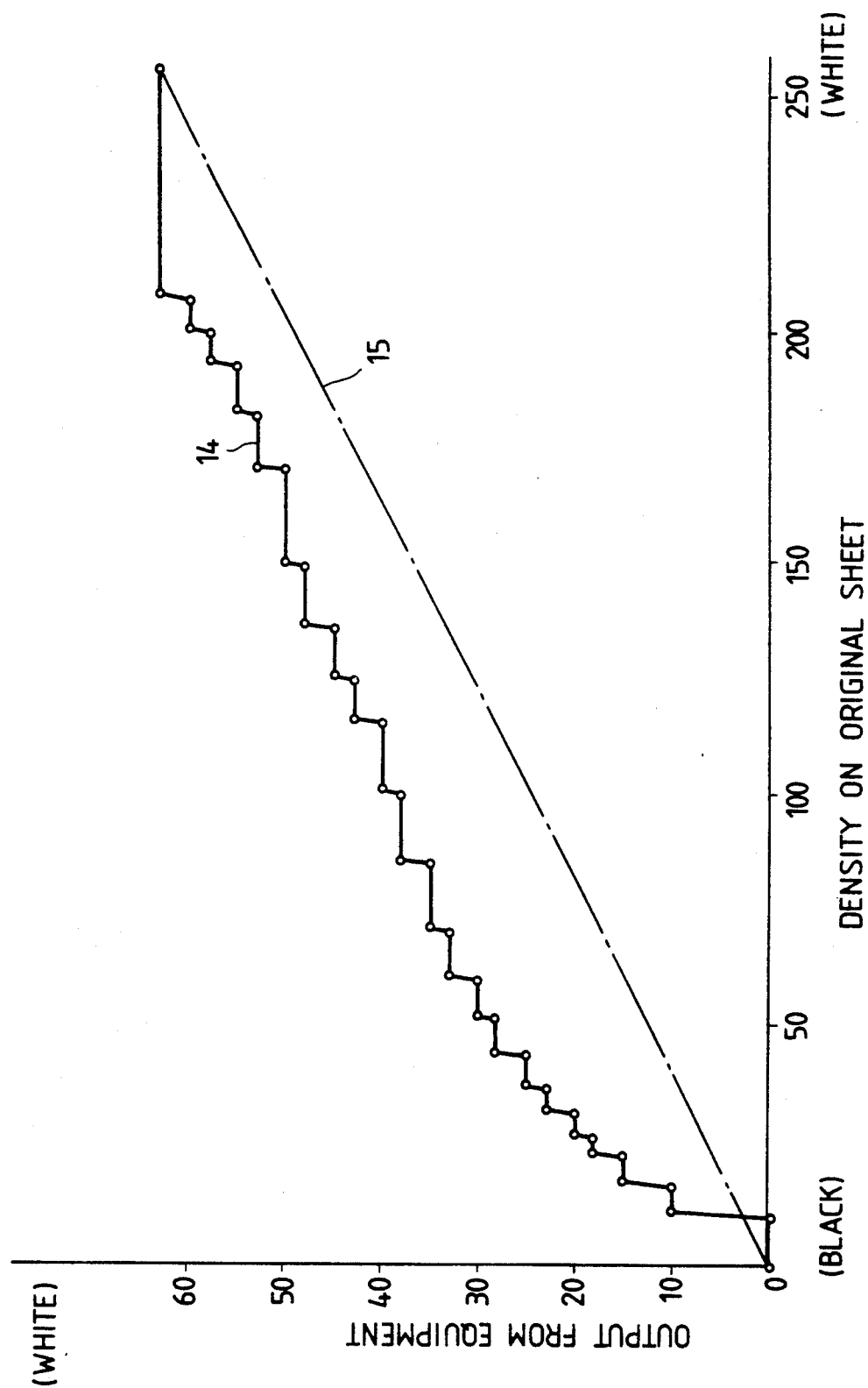
FIG. 2 is a chart illustrating the actual versus the ideal output characteristics of an exemplary conventional multiple value image input device.

Reference will now be made in detail to the construction of preferred embodiments according to the present invention a illustrated in the accompanying drawings, in which like reference characters designate like or corresponding parts throughout the several drawings.

In the following description, some embodiments of the present invention will be used as examples. It should be understood, however, that the present invention is not limited to these examples, but may be applied effectively to other embodiments covered by the appended claims and their equivalents.

First Preferred Embodiment

Figure 4:
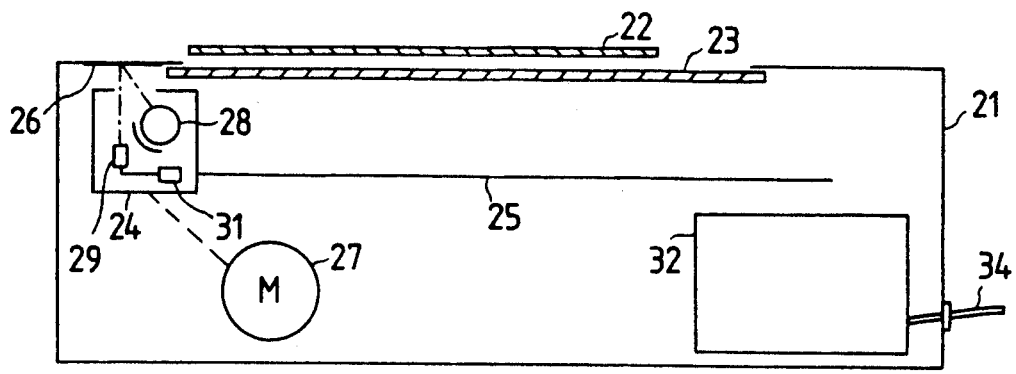
FIG. 4 is a schematic physical construction of the first embodiment of the present invention shown in FIG. 3.

FIG. 4 illustrates a schematic construction of a first preferred embodiment of a multiple value image input device 21 according to the present invention. Multiple value image input device 21 is provided with a platen glass 23 on the upper area of the main unit. Document sheets are set upon platen glass 23.

Inside device 21 is a scanning unit 24 and a guide rail 25. Scanning unit 24 moves along rail 25 in both directions. A density reference plate 26, which will be described in detail below, is arranged on a back surface of an upper panel of device 21 and is adjacent to an end part of platen glass 23 from which the scanning operation is to be started. A motor 27, which is installed toward the bottom of device 21, provides the power for the alternating movement of scanning unit 24.

Scanning unit 24 includes a fluorescent lamp 28 which projects a linearly-shaped beam of light onto sheet 22, and a linear image sensor 29 which performs photoelectric conversion of the projected lights rays reflected from sheet 22. The video signals from sensor 29, in synchronism with a clock signal (not shown), are amplified by a video amplifier 31 and fed to an electronic circuit block 32.

Electronic circuit block 32 processes the amplified signals for, among other purposes, correction of their chromatic gradation. The processed signals are carried by a cable 34 out of device 21 to other equipment, such as image editing equipment, (not shown). Electronic circuit block 32 also controls operations such as the control for driving motor 27 and the control of linear image sensor 29.

Figure 3:
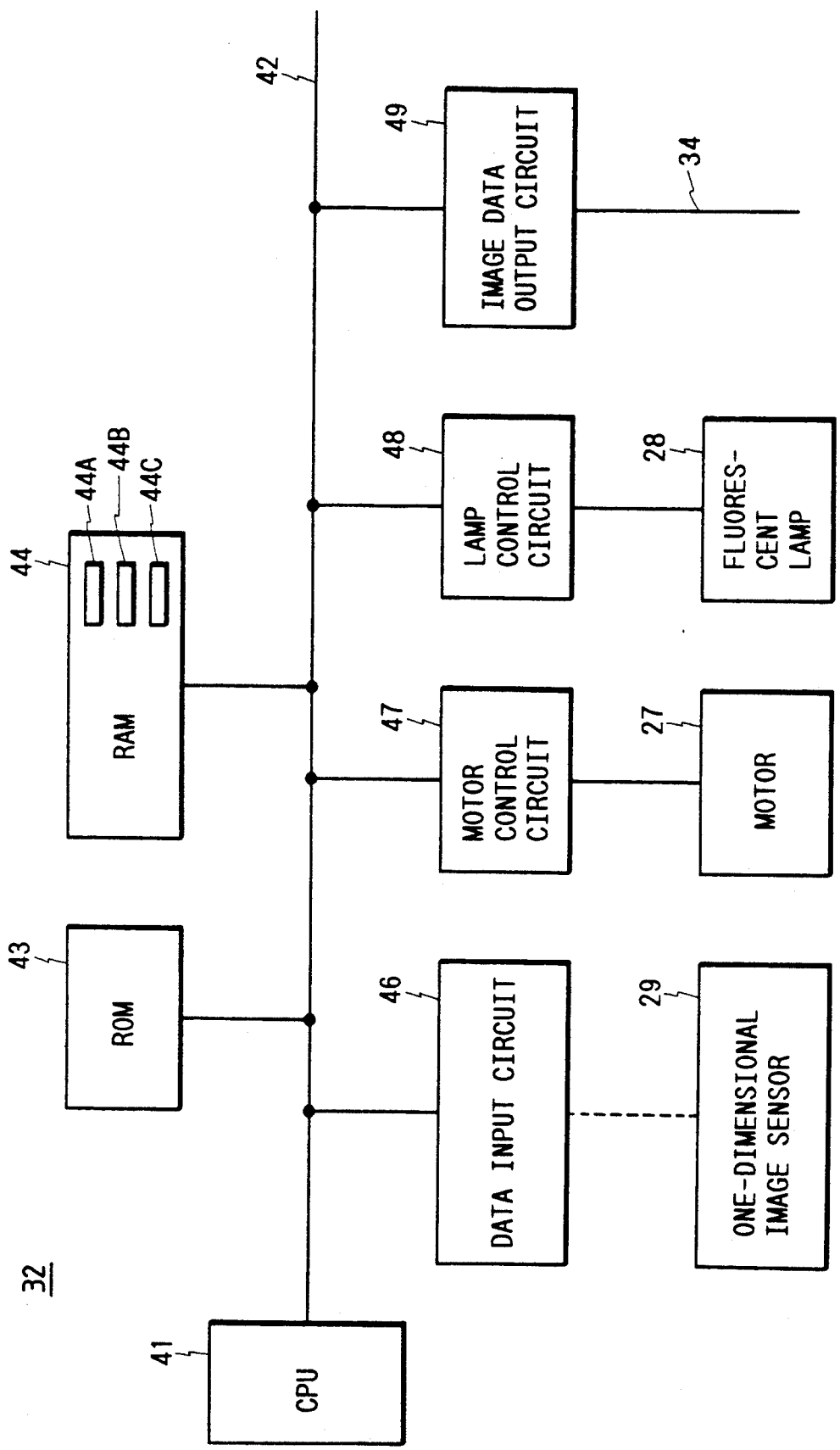
FIG. 3 is a block diagram illustrating the principal circuit elements of a first preferred embodiment a multiple value image input device according to the present invention.

FIG. 3 illustrates the preferred circuit construction of electronic circuit block 32. Electronic circuit block 32 contains a central processing unit (CPU) 41 connected via a bus 42 to ROM 43, RAM 44, data input circuit 46, motor control circuit 47, lamp control circuit 48, and image data output circuit 49. Bus 42 also includes a data bus.

ROM 43 is a read only memory device which stores the programs for executing various types of controlling operations by multiple value image input device 21.

RAM 44 is a random access memory used as a working memory device. RAM 44 includes various areas, such as a measured value storage area 44A which stores the measured values read from density reference plate 26 (FIG. 4), a before-correction data storage area 44B which temporarily stores uncorrected multiple value picture image data read from the original sheet by the linear image sensor 29, and a corrected data storage area 44C which stores the multiple value picture image data after their correction.

Data input circuit 46 receives the signals from linear image sensor 29, after they are amplified by video amplifier 31, converts those amplified signals into multiple value picture image data, and transmits the converted signals to bus 42.

Motor control circuit 47 controls motor 27, thereby also controlling the scanning operations for (1) reading the density reference plate 26 with the scanning unit 24, (2) reading the original sheet 22 with the scanning unit 24, and (3) returning the scanning unit 24 to its home position.

Lamp control circuit 48 controls fluorescent lamp 28.

Image data output circuit 49 transmits the corrected multiple value picture image data from corrected data storage area 44C in RAM 44 to cable 34 at a prescribed transfer rate.

Figure 5:
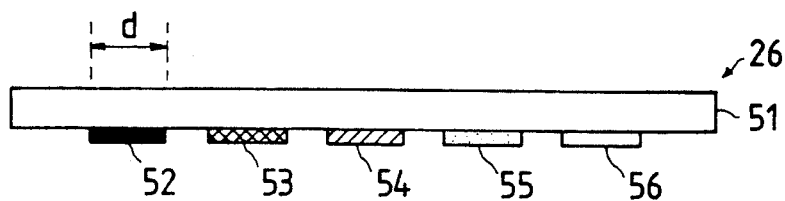
FIG. 5 is an enlarged side view of a the density reference plate of FIG. 4.

FIG. 5 is a side view of the construction of density reference plate 26. Density reference plate 26 is preferably formed by printing five types of density indicating segments, shown in FIG. 5 as 52 through 56, in a narrow strip on a plastic substrate 51. The strip width "d" of each of the density indicating segments is preferably set at 4 mm with a clearance of 2 mm provided between the strips. Preferably, density indicating segment 52 is printed in black ink; density indicating segment 53 is printed in relatively dark gray ink; density indicating segment 54 is printed in intermediate gray ink; density indicating segment 55 is printed in relatively bright gray ink; and density indicating segment 56 is printed in white ink.

FIG. 6 is a flowchart of the operations for reading the density reference plate using the first preferred embodiment of a multiple value image input device. First, CPU 41 (FIG. 3), waits for a scanning start instruction (Step 101). Upon receipt of this instruction, CPU 41 turns on fluorescent lamp 28 (Step 102) by controlling lamp control circuit 48.

Because fluorescent lamp 28 needs some amount of time, preferably between two to five seconds, until it can be considered to be in a stably lighted state, CPU 41 measures this period of time t (Step 103).

When this period of time t has elapsed, CPU 41 sets the scanning unit 24 at its home position (Step 104). Scanning unit 24 is normally put back to its home position when the reading of the original sheet is completed. If the power source is turned off, however, or if a power failure occurs during the return of scanning unit 24, scanning unit 24 may have been stopped at a point other than its home position. Therefore, scanning unit 24 can be set in its home position using a detecting operation by a sensor (not shown).

When scanning unit 24 is set in its home position, CPU 41 causes motor control circuit 47 to set scanning unit 24 into a subsidiary scanning operation under the first density indicating segment 52 on the density reference plate 26 (Step 105). With scanning unit 24 in this position, multiple value image input device 24 reads data for one scanning line (Step 106), then stores that data into actually measured value storage area 44A as the measured value for the area in black color ink (Step 107).

Next, CPU 41 checks whether all the reading operations have been completed for all the density indicating segments 52 through 56 on the density reference plate 26 (Step 108). If not, subsidiary scanning operations are performed by advancing the reading position to the next selected density indicating segment 53 (Step 109).

If multiple value image input device 21 reads picture images at a scanning density of 400 dpi (dots/inch), scanning unit 24 moves on to a point almost in the center of the second density indicating segment 53 by a subsidiary scanning operation performed for 94 lines with the numerical value set at "94." At this point, scanning unit 24 reads data for one line (Step 106), and stores this value in measured value storage area 44A as the actually measured value for the relatively dark gray color (Step 107).

Subsequently, measured values are obtained for the third to the fifth density indicating segments 54 through 56, respectively, by operations performed in the same manner, and the values thus obtained are stored in the actually measured value storage area 44A (Step 108) when all the density indicating segments 54 through 56 have been scanned, the reading operations on the density reference plate 26 are completed.

Now, in the operations described above, the individual density indicating segments 52 through 56 are read only once, but it is also possible to read the density indicating segment several times and obtain an average of the individual lines, or to read the density indicating segments several times and eliminate the noise components by eliminating the maximum value and the minimum value of each pixel before finding the average of the remaining values.

The control operations shown in FIG. 6 take the measured values into RAM 44 without examining any conditions. If, however, the density range corresponding to the background area of the density reference plate 26 happens to be included in the read data, the density reference plate 26 may have deviated from its normal position during reading. Also, it is desirable to discontinue the measurement, reset the scanning unit 24 in its home position, and then resume reading the density reference plate 26 from the beginning.

Figure 7:
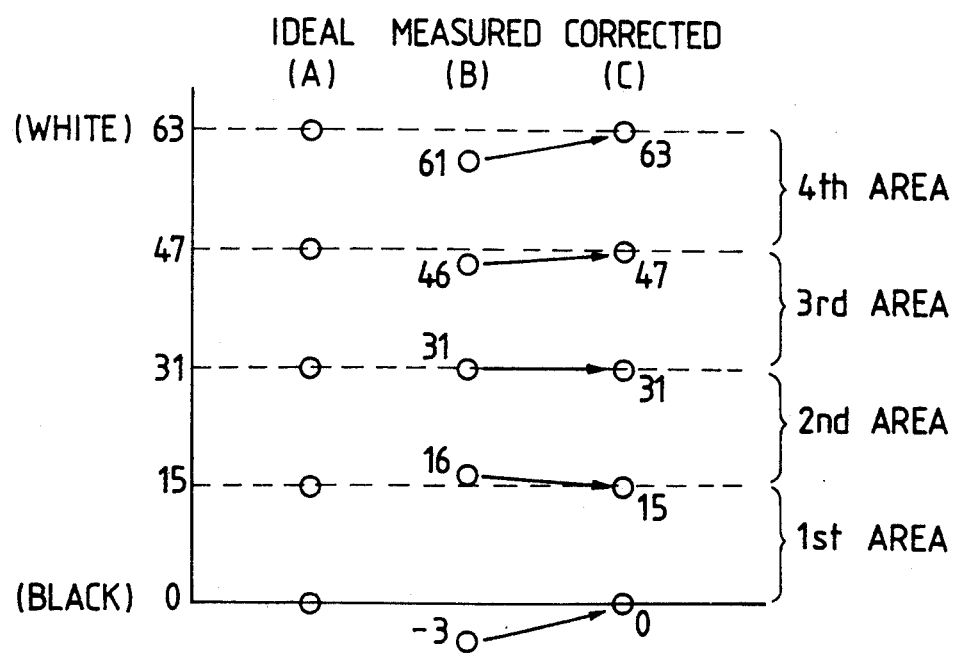
FIG. 7 is a chart illustrating possible values measured for the individual density indicating segments in the reference plate of FIG. 5, and an outline of density correction in accordance with the present invention.

FIG. 7 illustrates the principle of density correction using an example of measured values for density indicating segments 52 through 56. Column (A) in FIG. 7 shows ideal values for the respective signal levels of five density indicating segments 52 to 56 for five chromatic grades from black to white (FIG. 5). The ideal values for the signal levels are "0," "15," "31," "47," and "63," with a level difference of 16 between adjacent values.

Column (B) in FIG. 7 indicates the measured values stored in the actually measured value storage area 44A (See FIG. 1). The value of the signal level for the first density indicating segment 52 (black) is "−3." To correct of this signal level, this value is increased to the signal level "0" as shown in Column (C). Also, the signal level in the second density indicating segment 53, which represents a dark gray color, stands at "16," which will be reduced to the signal level "15." The same applies to the other actually measured signal levels. In this preferred embodiment, the area between the selected density indicating segments from "0" to "15" in the ideal values for the signal levels will be called "the first area," and in the same manner, the other areas in the subsequent ranges will be called, in order, "the second area," "the third area," and the "fourth area."

Figure 8:
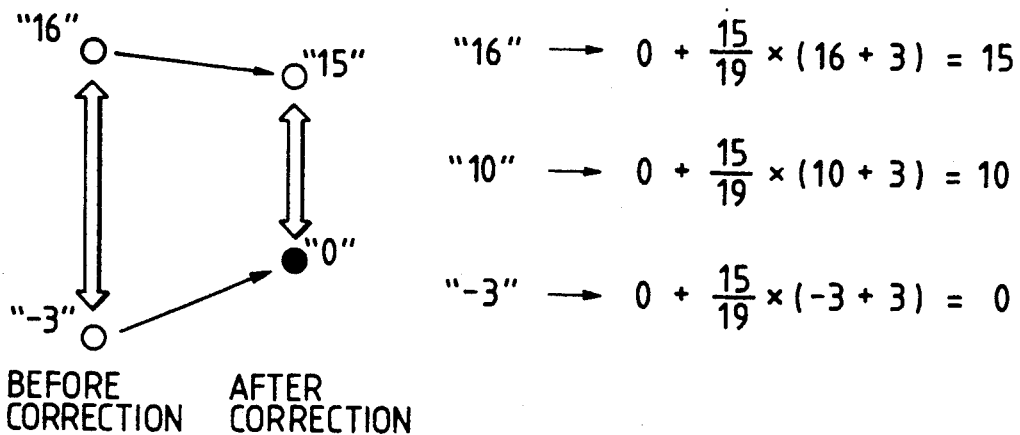
FIG. 8 is a chart illustrating the principle of correction applied to a first area.

FIG. 8 indicates the principle of correction applied to the first area in which the signal levels are in the range from 0 to 15. In this case, the measured values of the signal levels, which are in the range from −3 to 16, are corrected to a range from 0 to 15. A corrected value $A^{11}$ is obtained by the following equation (1):

$$A^{11} = 0 + \frac{15 - 0}{16 - (-3)} \times (\text{signal level} - (-3)) \quad (1)$$

That is to say, if the signal level of the multiple value picture image data for an original sheet is 16, this level is corrected to the signal level 15, as shown in FIG. 8, and if the signal level for the picture image data is −3, the level is corrected to 0. Moreover, an intermediate signal level, such as 10, is corrected to 10.26 by arithmetic operations with equation (1), and then to 10 by rounding.

Figure 9:
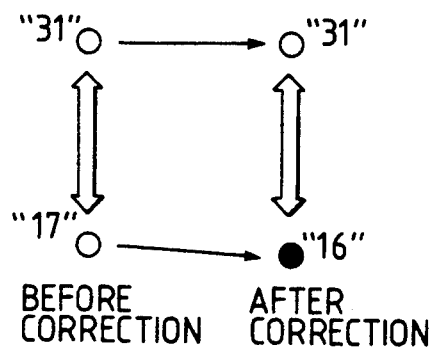
FIG. 9 is a chart illustrating the principle of correction applied to a second area.

FIG. 9 illustrates the principle of correction applied to the second area at the signal levels ranging from 16 to 31. In this case, the measured values of signal levels between 17 to 31 are corrected to a range from 16 to 31. At such a time, the corrected value $A^{12}$ is obtained by the following equation (2):

$$A^{12} = 16 + \frac{31 - 16}{31 - 17} \times (\text{signal level} - 17) \quad (2)$$

$$= 1.07 \times \text{signal level} - 2.21$$

Thus, if the signal level of the multiple value picture image data is 20, the corrected value $A^{12}$ is 19.21 and, by rounding, 19.

Figure 10:
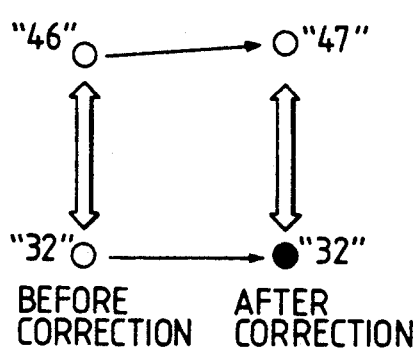
FIG. 10 is a chart illustrating the principle of correction applied to a third area.

FIG. 10 similarly illustrates the principle of correction applied to the third area in which the signal levels range from 32 to 47. At this time, the corrected value $A^{13}$ is found by the following equation (3):

$$A^{13} = 32 + \frac{47 - 32}{46 - 32} \times (\text{signal level} - 32) \quad (3)$$

Figure 11:
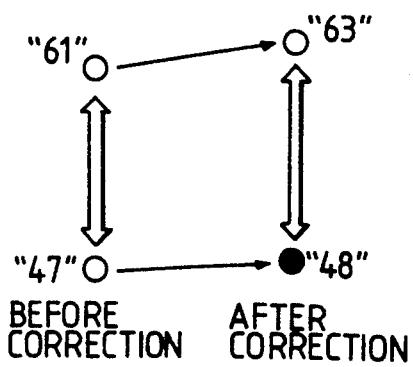
FIG. 11 is a chart illustrating the principle of correction applied to a fourth area.

FIG. 11 similarly illustrates the principle of correction applied to the fourth area in which the signal levels range from 48 to 63. At this time, the corrected value $A^{14}$ is obtained by the following equation (4):

$$A^{14} = 48 + \frac{63 - 48}{61 - 47} \times (\text{signal level} - 47) \quad (4)$$

Figure 12:
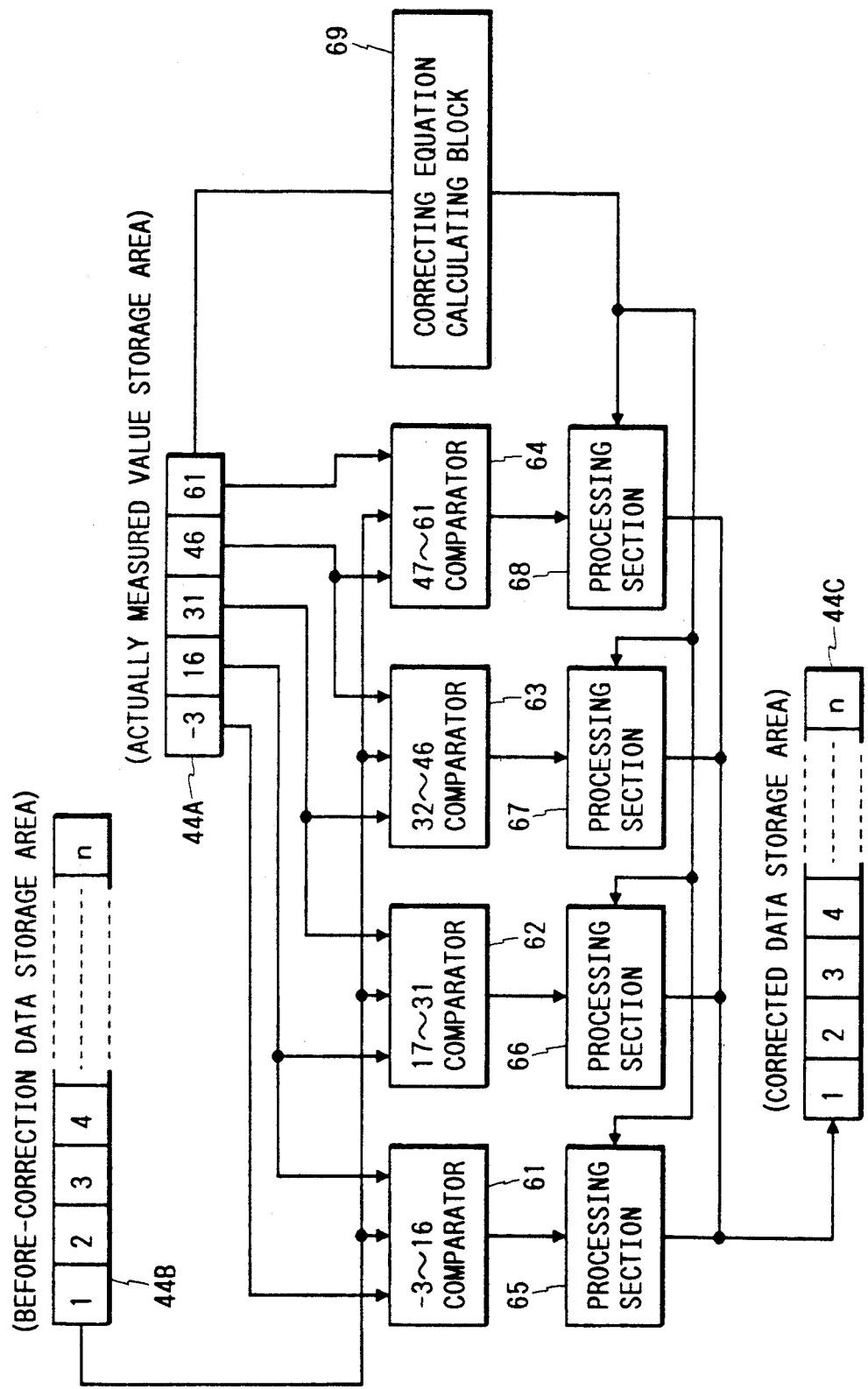
FIG. 12 is a chart illustrating circuitry to correct multiple value picture image data in accordance with the first preferred embodiment of FIG. 3.

FIG. 12 is a diagram to illustrate the principles of a procedure for correcting the measured values of the multiple value picture image data as obtained from reading an original sheet. The multiple value image input device preferably includes comparators 61 through 64 corresponding respectively to the first through fourth areas. The data for one line stored in the before-correction data storage area 44B in RAM 44 are read out in a regular order and fed to the comparators. Comparators 61 through 64 include first through fourth processing sections 65 through 68 connected to the respective output sides of comparators 61 through 64. Comparators 61 through 64 receive the measured values from the actually measured value storage area 44A and set the respective ranges for the measured values to correspond to the first to fourth of the areas on the basis of the values from area 44B.

Comparators 61 through 64 each compare their corresponding range with the signal levels of the multiple value picture image data. The ranges of comparators 61 through 64 do not overlap so that only one of the comparators 61 through 64 cover any particular value and routes multiple value picture image data having that value to its corresponding processing section.

For example, for an uncorrected multiple value picture image data at signal level 20, which is output from before-correction data storage area 44B, only the second comparator 62 would be set into its active state to route that multiple value picture image data to the second processing section 66.

Equation (1) is loaded as a correcting equation into the first processing section 65, equation (2) is loaded into the second processing section 66, equation (3) is loaded into the third processing section 67, and equation (4) is loaded into the fourth processing section 68. Correcting equation calculating block 69 performs arithmetic operations on the four types of measured values obtained from the actually measured value storage area 44A with equations (1) through (4).

First to fourth processing sections 65 through 68 correct the signal levels of the multiple value picture image data according to the particular correcting equations when the multiple image data are thus fed into them. The resulting correction values are stored as the into the memory areas allocated respectively to the relevant pixels in the corrected data storage area 44C.

For instance, with respect to the example given above, if multiple value picture image data at the signal level 20 are read out from the before-correction data storage area 44B, second comparator 62 is selected, and second processing section 66 corrects the data using the equation (2) and outputs the signal level 19 as the corrected value $A^{12}$. This corrected value is written to the relevant area in the corrected data storage area 44C in synchronism with a clock (not shown). In this manner, the first to fourth comparators 61 through 64 selectively output the multiple value picture image data in synchronism with the clock, and the corrected values of these data are found in the first to fourth processing sections 65 through 68 and stored in the corrected data storage area 44C.

These processing operations are repeated for each line, and the corrected multiple value picture image data are fed out from image data output circuit 49 to cable 34. In the course of these operations, the data stored in the before-correction data storage area 44B are replaced in a regular sequence. When another original document sheet is read, the density reference plate 26 is read afresh and, by the effect of this operation, the reading of the picture images can track changes taking place over time.

In the preceding description, the correcting process for each line has been described with reference to the hardware circuit illustrated in FIG. 12. This process can also be performed by operations with software through the execution of a program stored in ROM 43 (FIG. 1).

In the first preferred embodiment described above, corrections can be made to the multiple value picture image data by applying the two measured values from adjacent density indicating segments. It is also possible to find a density correction function passing through the measured values and to correct the picture image data by the application of the function.

Also, in the first preferred embodiment, five types of density indicating segments are arranged on the density reference plate 26, but it is also possible to omit the density indicating segment for the black color by taking measurements with the light source turned. It is therefore possible to measure values for three types of density with only two density indicating segments, one white and the other in a shade of gray. In this manner, the number of density indicating segments are not limited to those given in the first preferred embodiment.

In addition, the first preferred embodiment shows the density indicating segments arranged at equal density intervals. Corrections are desired to emphasize a certain range of density, such as those relevant to the color of facial complexions, the density indicating segments may be arranged to emphasize the importance of such a density range. For example, to emphasize the correction of density levels near signal level "31," density indicating segments can have density levels of 0, 22, 31, 40, and 63.

Thus, with the multiple value image input device of the first preferred embodiment, several density indicating segments set at different optical density levels are provided to correct density. The measured values for these density indicating segments would be stored in memory, and the corrections of the multiple value picture image data would be made with the stored values. Therefore, the present invention allows construction of a multiple value image input equipment device to achieve uniform characteristics even when various types of reading elements are used, and the invention also allows improved interchangeability of reading elements, greater ease of use, and wider range, in the selection of reading elements.

Moreover, the multiple value image input device of this invention allows selection of the most useful density indicating segments for correcting multiple value picture image data, which are the two density indicating segments having the values closest to the value to be corrected, the attaining objects of the present invention by correcting chromatic gradation in image data by using data relevant to the selected density indicating segments. Thus, this correction permits simplification of the arithmetic operations used to correct density.

Second Preferred Embodiment

FIG. 14 illustrates a schematic construction of a second preferred embodiment of the multiple value image device 21' according to the present invention. Those elements which are the same in the first and second preferred embodiments have the same reference characters, and their description will not be repeated.

The second preferred embodiment of the multiple value image input device is provided with two density reference plates. A first density reference plate 26-1, which will be described in detail below, is arranged on the back of the upper panel of device 21' adjacent to the part of a platen glass 23 from which the scanning operation is to be started. A second density reference plate 26-2 is arranged as a strip at one side area on the back face of the platen glass 23.

Figure 13:
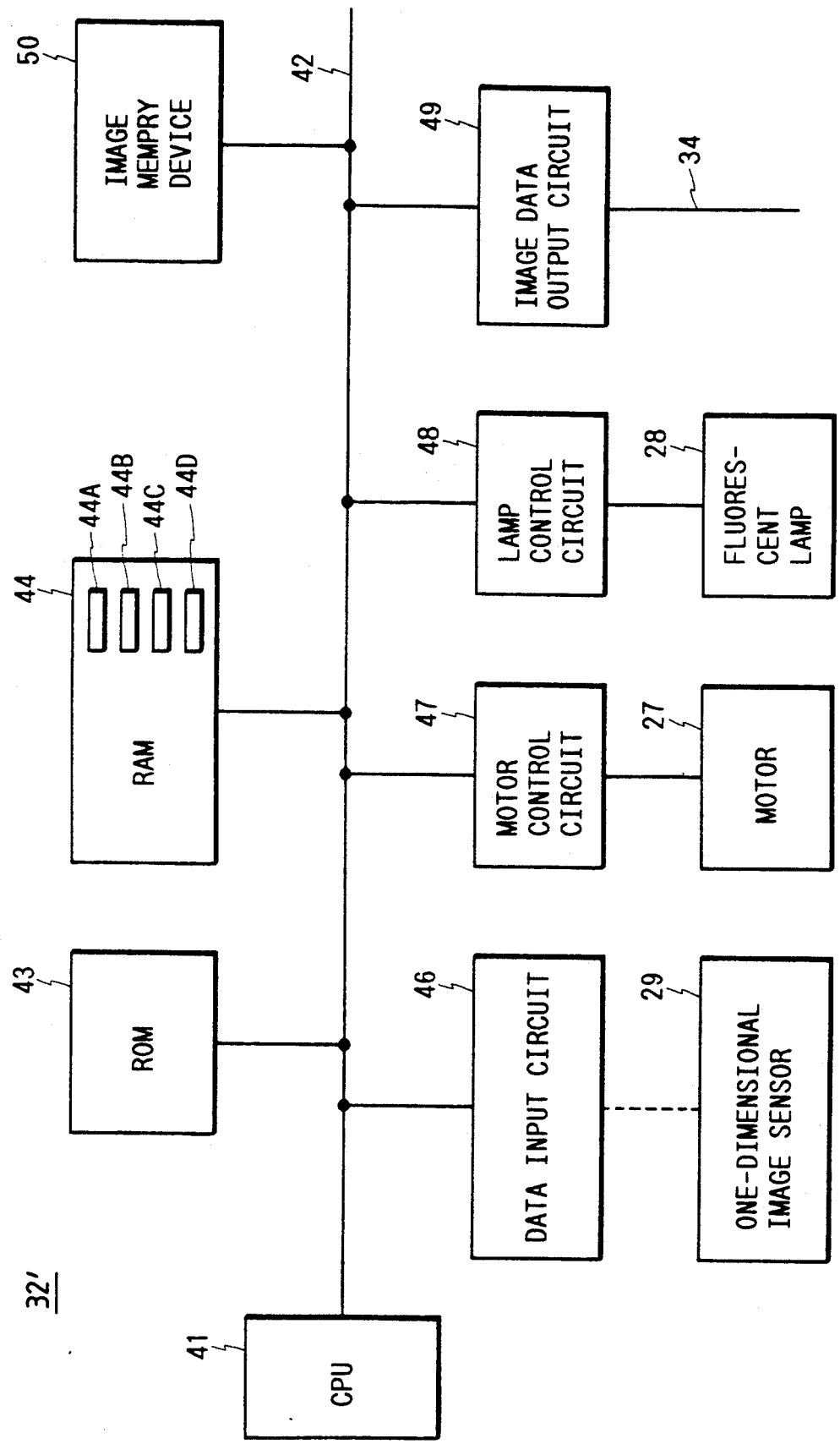
FIG. 13 is a block diagram illustrating the principal parts in the circuit construction a second preferred embodiment of a multiple value image input device according to the present invention.

FIG. 13 shows a diagram of the circuit construction of electronic control block 32, in FIG. 14. The circuit construction is basically the same as that of the electronic control block 32 used in the first of preferred embodiment, but also includes a maximum, minimum, and medium density data storage area 44D in RAM 44, and a picture image memory device 50.

With this maximum, minimum, and medium density data storage area 44D, device 21' continues to rewrite the maximum value and the minimum value of the optical density in regular succession throughout the course of the prescanning operation and stores in storage area 44D the maximum and minimum density value recorded when the reading operation is completed, as well as medium density values at two points between both these values. In this regard, the actually measured value storage area 44A is the storage area which stores the actually measured values read of the first density reference plate 26-1 and the second density reference plate 26-2.

Image memory device 50 is a memory device which stores the data for one page of the original document read with the linear image sensor 29. Because the second preferred embodiment of the multiple value image input device of this invention employs image memory device 50, it can find the distribution of density in the data without prescanning the original document.

FIG. 15 is a magnified illustration and a part of a first density reference plate 26-1 and the second density reference plate 26-2. The first density reference plate 26-1 is preferably constructed with nine strip-shaped density indicating segments 26-1-1 through 26-1-9 arranged in parallel along the main scanning direction of the linear image sensor 29 (FIGS. 12 and 13). The strip width "d" of each of the density indicating segments 26-1-1 through 26-1-9 is preferably 6 mm. First density indicating segment 26-1-1 has the optical density of "0" (black color) as represented on a scale in 64 chromatic grades, and the optical density levels of these first to ninth density indicating segments 26-1-1 through 26-1-9 have progressively regular increases in brightness with the ninth density indicating segment 26-1-9 having an optical density value of "63" (white color). The density levels of the individual density indicating segments are stored in advance in ROM 43 as the ideal values.

Second density reference plate 26-2, which is arranged in the subsidiary scanning direction of the linear image sensor 29, is composed of three subsidiary density indicating segments 26-2-1 through 26-2-3 which are strips each having a width of 5 mm. The optical density of the first subsidiary density indicating segment 26-2-1 is "63" (white). The optical density of the second subsidiary density indicating segment 26-2-2 is "31" (gray). The optical density of the third subsidiary density indicating segment 26-2-3 is "0" (black).

The second preferred embodiment of the multiple value image input equipment is capable of accepting picture images standard A-3 size documents. Because an A-3 size document has a length of 297 mm in the main scanning direction, 4,677 pixels are needed to read an A-3 document at a density of 400 dpi (dots/inch).

Linear image sensor 29 in the second preferred embodiment is equipped with a reading element unit composed of 5,000 pixels. Because the number of pixels corresponding to each of the individual subsidiary density indicating segments 26-2-1 through 26-2-3 is 79 pixels, second density reference plate 26-2 can be set up outside of the reading area for an original document sheet.

It is also possible to reduce the width of the individual subsidiary density indicating segments 26-2-1 through 26-2-3, which makes possible either reduction in the length of image sensor 29 or an increase in the number of subsidiary density indicating segments.

Figure 16:
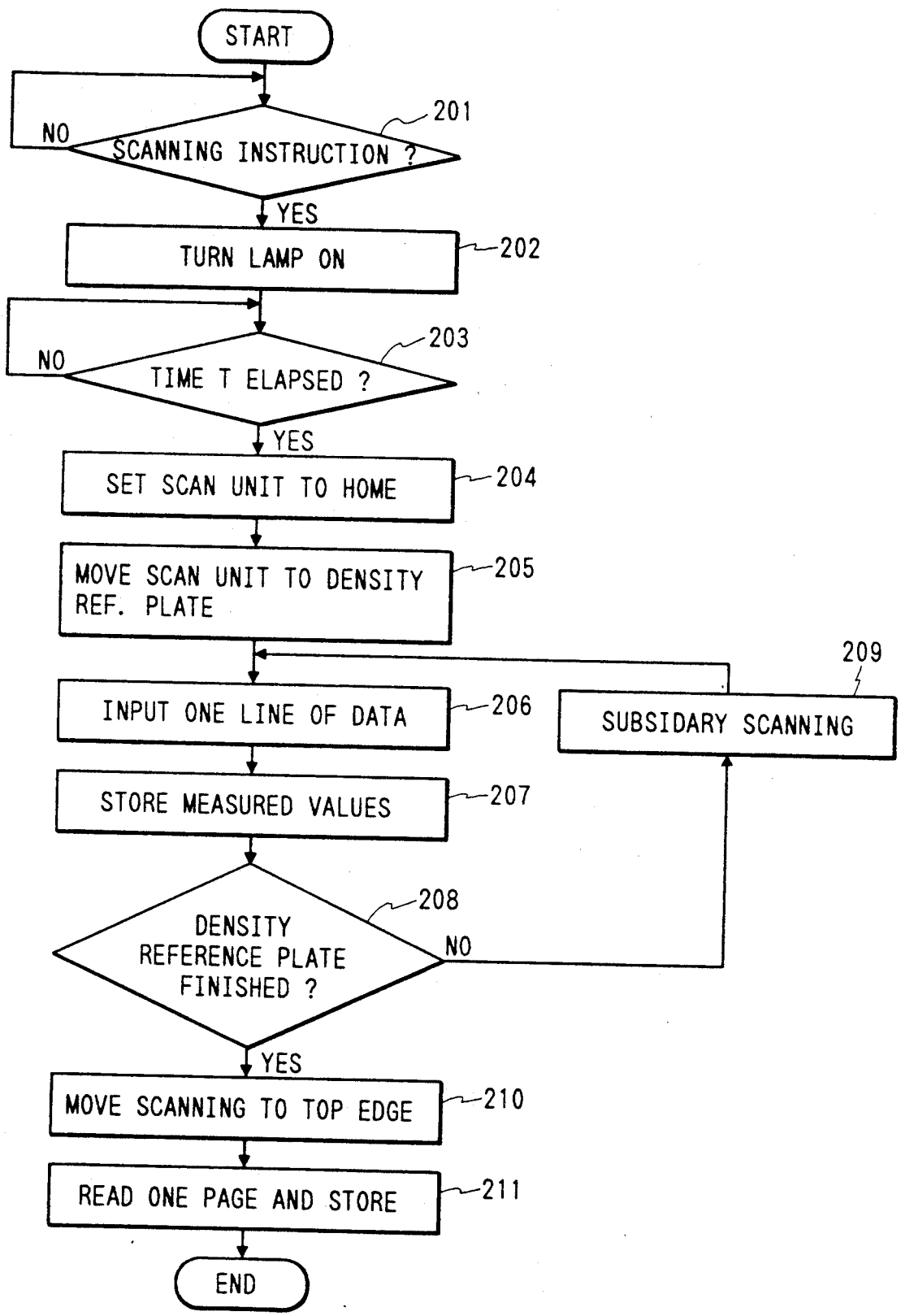
FIG. 16 is a flow chart illustrating reading operations performed by the second preferred embodiment.

FIG. 16 illustrates an outline of the reading operations in the second preferred embodiment of the multiple value image input device shown in FIGS. 13 and 14. When a scanning start instruction is received (Step 201), CPU 41 (FIG. 3) turns on the fluorescent lamp 28 (Step 202) by controlling the lamp control circuit 48. Because the fluorescent lamp 28 needs between two and five seconds before it can be put into a stably lighted state, CPU 41 measures a period of time t (Step 203). When period of time t has elapsed, CPU 41 sets the scanning unit 24 to its home position (Step 204).

Scanning unit 24 is usually returned to its home position when the reading of the original sheet is completed. However, if the power source is turned off or if a power failure occurs during the return of scanning unit 24, scanning unit 24 may be stopped at a point other than its home position. The setting of scanning unit 24 in its home position is therefore preferably performed using a detecting operation preferred by a sensor (not shown).

When scanning unit 24 is set in its home position, CPU 41 controls motor control circuit 47 to set scanning unit 24 into a scanning operation for reading exactly under the first density indicating segment 26-1-1 (Step 205). First density indicating element 26-1-1 is arranged on the side of the first density reference plate 26-1 furthest from the original document sheet. With scanning unit 24 set in this state, multiple value image input device 21, reads data for one scanning line ( Step 206) and stores the read data in the actually measured value storage area 44A as the measured value for the area (Step 207).

Next, CPU 41 checks whether all the reading operations have been completed on all the density indicating segments 26-1-1 through 26-1-9 on the density reference plate 26 (Step 208). If not, the CPU 41 puts scanning unit 24 into a subsidiary scanning operation by moving a the prescribed number of lines to advance scanning unit 24's reading position to the next selected density indicating segment (Step 209). With multiple value image input device 21, reading picture images at a scanning density of 400 dpi, scanning unit 24 preferably moves from the first density indicating segment 26-1-1 to the second density indicating segment 26-1-2 by a subsidiary scanning operation performed for 94 lines.

Next, scanning unit 24 reads data for one line (Step 206), and this value is stored in the actually measured value storage area 44A as the measured value for the corresponding area (Step 207).

Subsequently, the actually measured values are obtained for the remaining selected density indicating segments 26-1-3 through 26-1-9 by operations performed in the same manner, and the values thus obtained are stored in the actually measured value storage area 44A.

When the reading operations on the first density reference plate 26-1 are completed (Step 208), CPU 41 puts the scanning unit 24 into a scanning operation to the top edge area of the original document sheet 22 (Step 210), and thereafter moves on to reading operations on the second density reference plate 26-2 and the original sheet 22 with scanning operations performed on the succeeding lines. The picture image data thus read are processed for analog-digital conversion and are then stored in image memory device 50.

FIG. 17 illustrates one example of the data stored in the storage area 44A and memory device 50 when the reading operations have been completed by multiple value image input device 21'. In the actually measured value storage area 44A, the density levels of the first to ninth density indicating segments 26-1 through 26-9 on the density reference plate 26-1 are, stored as registering the signal levels in 64 stages. FIG. 17, however, only indicates the values for a certain pixel in the linear image sensor 29.

In FIG. 15, the density level of the second density indicating segment 26-2 is "7," but the signal level obtained through the reading operation is shown as "5." This indicates that the particular pixel has read the density level as darker than the actual optical density. The density level of the next segment, namely, the third density indicating segment 26-3, is "15," but the signal level obtained by the reading operation is indicated as "16." In this case, the signal level is read at a level brighter than the actual optical density. The image memory device 50 stores the signal levels in 64 stages with the errors deleted at the time of reading.

In this regard, the maximum value of the signal level of the picture image data obtained by the particular pixel from reading the original sheet 22 is 50 and the minimum value is 10. These values are obtained by detecting the maximum value and the minimum value through the scanning of the memory area corresponding to the particular pixel in the image memory device 50.

First-stage Correction of Signal Levels

As described above, the second preferred embodiment of the multiple value image input device corrects the signal levels with four density indicating segments selected from the first density reference plate 26-1 for the operation. Then, the multiple value image input device performs correcting operations again, with reference to the second density reference plate 26-2, using the results obtained from this first-stage correction. Here, a description is first made of the correction of the signal levels at the first stage of correcting operations.

Two of the density indicating segments on the first density reference plate 26-1 are selected as the ones closest to the measured maximum and minimum signal level values which bound these values in ranges between the selected values. As the result, the second density indicating segment 26-2 at the signal level 5 is selected for the signal level 10. And, the eighth density indicating segment 26-8 at the signal level 56 will be selected for the signal level 50.

In addition, the two signal levels "24" and "37" which are positioned at almost equal intervals to the two signal levels of the second density indicating segment 26-2 and the eighth density indicating segment 26-8 are selected. Thus, the signal levels of the four density indicating segments selected in this manner are "5," "24," "37," and "56," and these signal levels are stored in the maximum, minimum, and medium density data storage area 44D.

Figure 18:
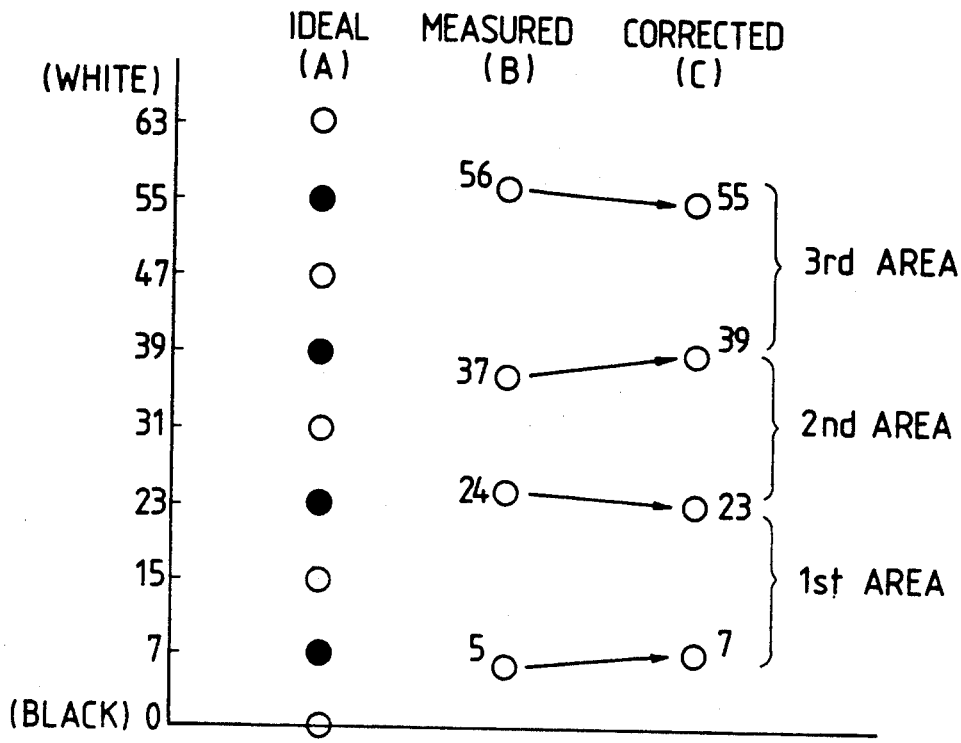
FIG. 18 is a chart illustrating the principle of correction with respect to the first density reference plate in FIG. 15.

FIG. 18 illustrates the actually measured values, as well as the principle of density correction, with respect to each of the density indicating segments 26-1-1 through 26-1-9. Column (A) shows the values indicating the respective signal levels (namely, the chromatic grades) of the nine density indicating segments from 26-1-1 to 26-1-9 as stored in the ROM 43. Of these, the four values each marked by a large filled-in bullet (o) represent the signal levels which correspond ideally to each of the optical density values of the four density indicating segments which have been selected, 26-1-2, 26-1-4, 26-1-6, and 26-1-8,. The five values each marked by a large hollow bullet (o) represent the signal levels of the same nature for the five density indicating segments from which have been excluded from the selection, 26-1-1, 26-1-3, 26-1-5, 26-1-7, and 26-1-9.

In FIG. 18, Column (B) indicates the measured values stored in the actually measured value storage area 44A (See FIG. 13). For the correction of the signal levels, these measured values are to be set at the levels as shown in Column (C). For example, the signal level in the second density indicating segment 26-1-2 is "5," and it is therefore necessary to increase this value to the signal level "7."

In this second preferred embodiment, the areas between the four selected density indicating segments on the first density reference plate 26-1 are called the first area, the second area, and the third area in order beginning with the black color. As can be seen by reference to FIG. 18, these individual areas are set in almost equal widths.

Figure 19:
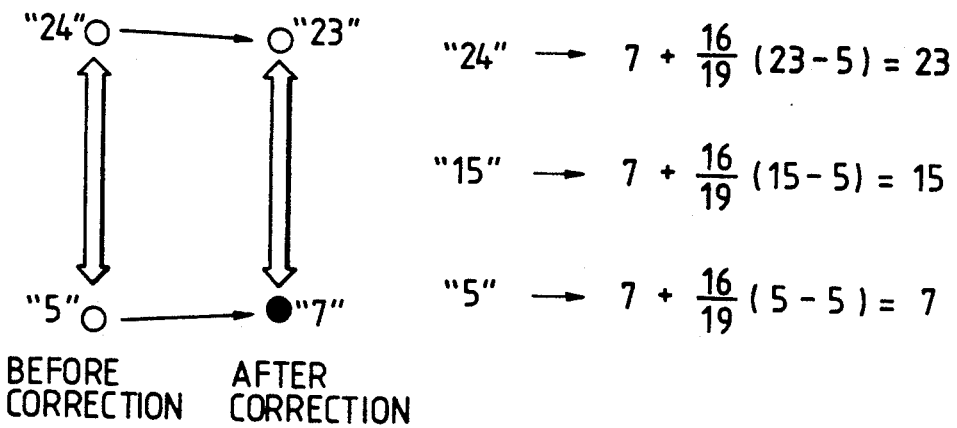
FIG. 19 is a diagram illustrating the principle of correction with respect to a first area.

FIG. 19 shows the principle of correction with respect to the first area where the signal levels range from "7" to "23" in the example shown in FIG. 18. In this case, the actually measured values of the signal levels, which are in the range from "5" to "24" are corrected to a range from "7" to "23." In this instance, the corrected value $A^{21}$ is found by the following equation (5):

$$A^{21} = 7 + \frac{23 - 7}{24 - 5} \times (\text{signal level} - 5) \quad (5)$$

Thus, if the signal level of the multiple value picture image an original sheet is 24, it is corrected to the signal level 23 as shown in FIG. 19, and if the signal level for the picture image data is 5, it is corrected to 0. Moreover, an intermediate value such as 15 is corrected to 15.36 by equation (5), and the signal level 15 is obtained by rounding.

FIG. 20 illustrates the principle of correction applied to the second area at the signal levels ranging from 24 to 39. In this case, the actually measured values at the signal values of 25 to 37 are corrected to a range from 24 to 39. At such a time, the corrected value $A^{22}$ is obtained by the equation (6) given in the following:

$$A^{22} = 24 \frac{39 - 24}{37 - 25} \times (\text{signal level} - 25) \quad (6)$$

$$= 1.25 \times \text{signal level} - 7.25$$

For example, if the signal level of the multiple value picture image data is 35, the corrected value $A^{22}$ is found to be 36.5, or 37 after rounding.

FIG. 21 similarly illustrates the principle of correction with respect to the third area in which the signal levels range from 40 to 55. At this time, the corrected value A is found by the equation (7) given in the following:

$$A^{23} = 40 + \frac{55 - 40}{56 - 38} \times (\text{signal level} - 38) \qquad (7)$$

Second-stage Correction of Signal Levels

Figure 22:
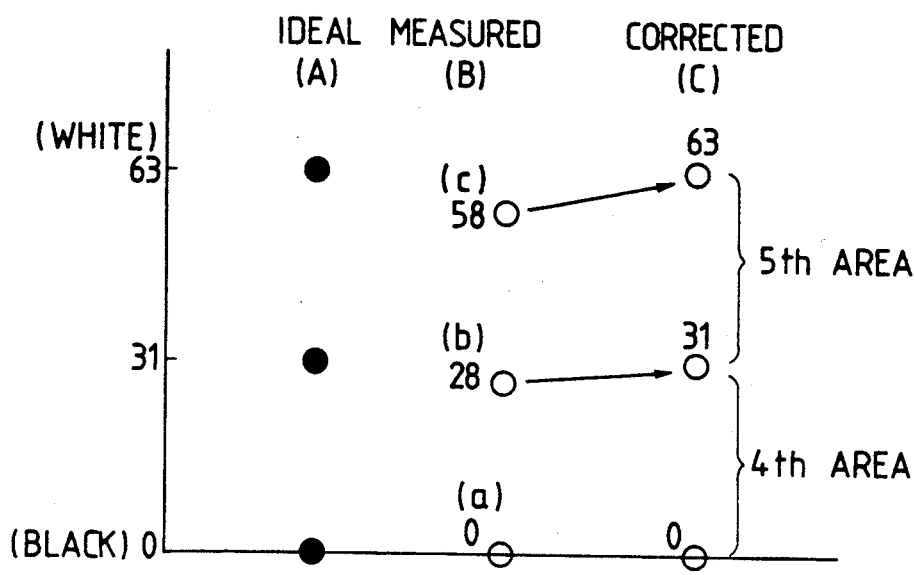
FIG. 22 is a chart illustrating the principle of correction with respect to the second density reference plate in FIG. 15.

FIG. 22 illustrates the principle of correction as applied to each of the measured values for the density of the individual density indicating segments 26-2-1 through 26-2-3 on the second density reference plate 26-2. Column (A) shows the ideal values for the signal levels (namely, the chromatic grades) of the three density indicating segments 26-2-1 to 26-2-3 stored in the ROM 43. Column (B) indicates the measured values stored in the actually measured value storage area 44A (FIG. 13) with respect to the three density indicating segments 26-2-1 through 26-2-3. In correcting the signal levels, these measured values are set at the levels as shown in Column (C) in FIG. 22. For example, the signal level of the actually measured value in the first density indicating segment 26-2-1 is "58," and it is necessary to increase this value to the signal level "63."

Now, with respect to the second density reference plate 26-2, the actually measured values are obtained as an average of values found for each line by scanning unit 24 after eliminating noise components from the values obtained when it reads several lines, for each pixel with respect to each of the density indicating segments 26-2-1 through 26-2-3. As explained above, the measured values obtained in this manner are not constant for all the lines. Therefore, the values measured for the three density indicating segments 26-2-1 through 26-2-3 in FIG. 22 will be expressed as generalized values by "c," "b," and "a." In this case, the correction of a signal level may be expressed as the correction of the signal level "c" to that of "63," the correction of the signal level "b" to that of "31," and the correction of the signal level "a" to that of "0."

Figure 23:
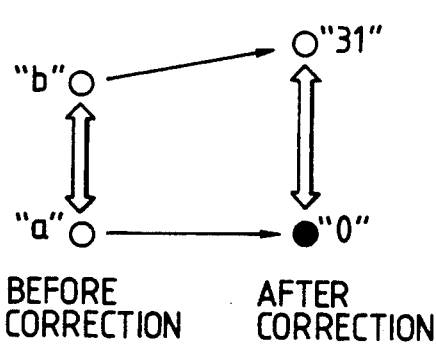
FIG. 23 is a chart illustrating the principle of correction with respect to a fourth area.

FIG. 23 shows the principle of correction with respect to the fourth area where the signal levels range from "0" to "31." In this case, the measured values of the signal levels, which are in the range from a to b are corrected to a range from 0 to 31. In this instance, the corrected value $A^{24}$ is found by the following equation (8):

$$A^{24} = 0 + \frac{31 - 0}{b - a} \times (\text{signal level} - a) \qquad (8)$$

If, for example, the signal level of given picture image data is 28 where, a=0, b=28, this value is corrected to the signal level 31. If the signal level for the picture image data is 0, the value is corrected to "0." An intermediate value, such as 15, is corrected to 16.61 by equation (8), and rounded to 17.

Figure 24:
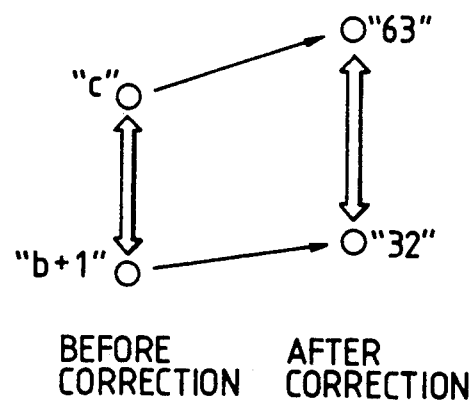
FIG. 24 is a chart illustrating the principle of correction with respect to a fifth area.

FIG. 24 illustrates the principle of correction applied to the fifth area at the signal levels ranging from 32 to 63. In this case, the measured values from "b+1" to "c" are corrected to be in a range from 32 to 63. The corrected value $A^{25}$ is obtained by the following equation (9):

$$A^{25} = 32 + \frac{63 - 32}{c - (b + 1)} \times (\text{signal level} - (b + 1)) \qquad (9)$$

If a=0, b=28, and c=58, $$A^{25} = 32 + \frac{31}{29} \times (\text{signal level} - 29) \qquad (9,)$$

If, for example, the signal level of the multiple value picture image data on the original sheet is 35, the corrected value $A^{25}$ is found to be 38.41, which rounds to 38.

Figure 25:
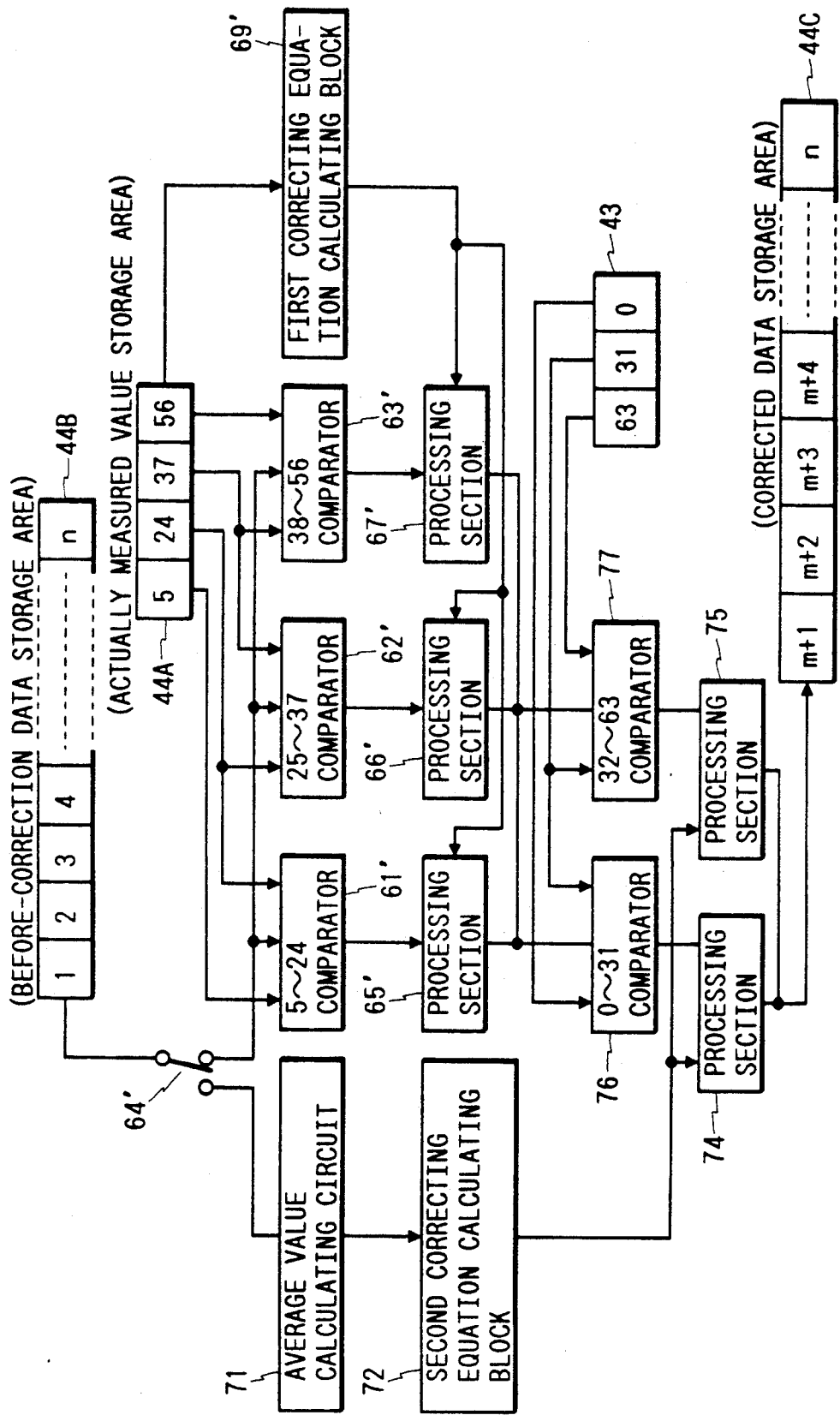
FIG. 25 is a block diagram illustrating circuitry to correct multiple value picture image data in the second preferred embodiment.

FIG. 25 illustrates in principle a procedure for correcting the multiple value image data obtained from reading an original sheet prior to correction. This multiple value image input device 21' includes first to third comparators 61', 62', and 63'. Picture image data in the original sheet reading area as selected by a changeover switch 64 are read out in regular sequence from the data stored for one line in the before-correction data storage area 44B in RAM 44, and are fed to these comparators. The first through third comparators 61' through 63', corresponding to the first through third areas, respectively have outputs connected to first through third processing sections 65' through 67, respectively.

Comparators 61' through 63' receive the measured values from the actually measured value storage area 44A and set the respective ranges of the measured values to correspond to the first through third areas on the basis of the measured values. The ranges of the comparators are non-overlapping so that only one of the first through third comparators 61' through 63' has a relevant range for each particular signal level value and outputs the corresponding multiple value picture image data having that value to the corresponding processing section.

For example, for multiple value picture image data having a signal level 15 which has been stored from the image memory device 50 into the before-correction data storage area 44B and then output, only the first comparator 61' will be set into its active state to feed the multiple value picture image data to the first processing section 65'.

The first through third processing sections 65' through 67' are loaded with correcting equations respectively corresponding to the correcting equation calculating block 69'. In this case, the first correcting equation calculating block 69' obtains the four types of measured values selected from the actually measured value storage area 44A and performs arithmetic operations with the equations (5) through (7). Equation (5) is then loaded as a correcting equation into the first processing section 65', equation (6) is loaded as the correcting equation into the second processing section 66, and equation (7) is loaded as the correcting equation into the third processing section.

The picture image data for the second density reference plate 26-2 from the before-correction data storage area 44B is routed, by changeover switch 64', to an average value calculating circuit 71 which obtains the three signal levels c, b, and a. These signal levels are fed into a second correcting equation calculating block 72 which gives two correcting equations for the line intended for such corrections. These correcting equations are expressed by the equations (8) and (9). Of these equations, equation (8) is fed into a fourth processing section 74 and equation (9) is fed into a fifth processing section 75.

The results obtained from processing the data in the first through third processing sections 65' through 67' are fed into the fourth and the fifth comparators 76 and 77. Constants for comparison are fed from the ROM 43 to these comparators 76 and 77 (FIG. 14). The fourth comparator 76 will be activated when the signal level derived as the result of a correction for each pixel assumes a value between 0 to 31, and will feed the signal level to the fourth processing section 74. The fifth comparator 77 is activated when the signal level derived as a result of a correction made for each pixel assumes a value between 32 to 63 and feeds the signal level to the fifth processing section 75. The fourth processing section 74 and the fifth processing section 75 are activated on a mutually exclusive basis.

Thereafter, the processing sections store the results of such corrections in the relevant memory areas for the particular pixels in the corrected data storage area 44C in synchronism with a clock (not shown). In this regard, if the first pixel in the original sheet reading area of the linear image sensor 29 is the m+n-th pixel, the corrected picture image data on the pixels from (m+1) to n will be stored in the corrected data storage area 44C.

For example, in the preceding example, multiple value picture image data at a signal level of 15 are read out from the before-correction data storage area 44B in synchronism with a clock (not shown). In this case, the first comparator 61' is selected, and the first processing section 65' corrects the data using equation (5), and outputs the signal level 15 as the corrected value $A^{21}$. On the basis of this corrected value, the fifth comparator 76 is selected. If the results obtained on the line from reading the second density reference plate 26-2 indicates that the signal levels are a=0, b=28, and c=58, as mentioned above, the fourth processing section 74 corrects the signal level to the value 17.

These processing operations are repeated for each line each time picture image data are read out of the image memory device 50 and output from the before-correction data storage area 44B. Each time the reading operation shifts to another line, the second correcting equation calculating block 72 works out a correcting equation, thereby changing the correction for each line. The corrected multiple value picture image data stored in the corrected data storage area 44C are sent from the image data output circuit 49 to the cable 34. Moreover, if another original document sheet is set, density reference plate 26-1 is read afresh and with the new density reference values, the picture images on the new document sheet can be read in a manner suitable for tracking changes occurring over time.

The preferred embodiment is designed to correct the read multiple value picture image data by applying the two measured values for adjacent segments, but it is also possible to use the actually measured values to find a density correction function passing through these values and to correct the picture image data by the application of the function.

In this regard, assume the maximum value found in the image memory device 50 from reading a photograph is at the signal level 50 while the minimum level found in the same memory device 50 is at the signal level 10. Because the density in a photograph can vary over the entire range, density correction can be made during a reading operation with a prescribed number of medium density values found on the basis of the maximum value and the minimum value obtained in the manner described above. However, when the document being read has mainly black and white input, the signal levels may be in the range from 0 to 63, but the intermediate degrees of density between these values often appear in a discontinuous spectra. Therefore, the optimum result will not necessarily be achieved even if the medium density values are determined by the method described for the second preferred embodiment. In such a case, it will be effective to modify the method of determining the medium density values through arithmetic operations.

Moreover, the second preferred embodiment described above is designed to find the maximum value and the minimum value of density for the entire area of the original sheet and to select the degrees of density for the halftone range, taking the maximum and minimum values as the reference values. There are original sheets on which the distribution of density differs between the upper and lower halves of the same sheet. It is possible to divide such sheets into several areas, to find the maximum value and the minimum value for each area, to select several density indicating segments for each area, and to make corrections on each area.

It is also possible to change the number of the density indicating segments. For example, if the upper half of an original sheet contains characters while the lower half of the same sheet contains a photograph, and the signal levels are divided sharply between "0" and "63" on the upper half, it is sufficient simply to convert the data in the upper half into binary value and to select four density indicating segments for the lower half.

Moreover, the second preferred embodiment of the multiple value image input device employs the first density reference plate 26-1 with individual density indicating segments such as those shown in FIG. 15 arranged in adjacent positions. It is also possible to print the density indicating segments 52 through 58 each set having a width "d" at prescribed intervals in the main scanning direction on a density printing plate 51 in a white color or the like as illustrated in FIG. 5 (for the first example of preferred embodiments). In the example shown in FIG. 5, the equipment is provided with a total of five density indicating segments 52 through 56 respectively set at different degrees of optical density. The density indicating segments according to the present invention as not limited to this arrangement, however the density indicating segments may instead be sat up for nine such segments, as with the second preferred embodiment, or more than nine segments. Similarly, the number of areas and the manner of arrangement of the second density reference plate 26-2 are not limited to those described in the second preferred embodiment.

Furthermore, this example of preferred embodiments shows a multiple value image input equipment which obtains the maximum value and the minimum value after storing the image data in the image memory device. It is also possible to obtain the maximum value and the minimum value by using the picture image data written to the image memory device. Furthermore, it is also possible to omit the use of an image memory device and to perform a prescanning operation on the original sheet instead, or to perform correcting operations directly without selecting density indicating segments.

Thus, the second preferred embodiment cf the multiple value image input device is provided with density reference plates arranged in the main scanning direction and in the subsidiary scanning direction allows the present invention to correct picture images with a high degree of precision even with fluctuations in the quantity of light from the light source, and to perform highly accurate reading of multiple value picture images having many chromatic grades.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described to explain the principles of the invention and its practical application to enable one skilled in the art to use the invention in various embodiments and with various modifications as are suited to the particular use contemplated. It is intended that the scope of the invention be defined by the appended claims and their equivalents.

What is claimed is:

1. A multiple value image input device for reading images from a document, the device comprising:
   a linear image sensor including a plurality of pixels arranged along a main scanning direction for producing outputs representing optical density;
   at least three density indicating segments arranged along the main scanning direction of the linear image sensor, each of the segments having a different optical density;
   analog-digital conversion means, coupled to the image sensor, for converting outputs from the image sensor into image data;
   memory means, coupled to the analog-digital conversion means, for storing image correction data corresponding to the outputs for each pixel when the sensor is in a position to detect the density indicating segments; and
   multiple value image data correcting means for correcting image data obtained by each pixel when the sensor is in a position to detect optical density from the document, the multiple value image data correcting means including
      means for selecting, for each value of the image data, at least two values of the image correction data, and
      means for applying one of a plurality of correction functions to each value of the image data, the means for applying including a plurality of processing sections that each apply one of the plurality of correction functions to a value of the image data, and the processing sections being selectively activated depending on the two image correction data values selected by the selecting means.

2. The multiple value image input device of claim 1, wherein:
   the memory means includes means, coupled to the analog-digital conversion means, for storing the values of the image data obtained by each pixel when the sensor is reading images from the document;
   the selecting means includes adjacent value selecting means for selecting, for each of the image data values, the two of the image correction data values which are closest to the corresponding image data value; and
   the applying means includes means for determining a linear relationship between the two selected image correction data values as the correction function applied by the activated processing section.

3. A multiple value image input device for reading images from a document, the device comprising:
   a linear image sensor including a plurality of pixels arranged along a main scanning direction for producing outputs representing optical density;
   a plurality of density indicating segments located in a first density reference area and arranged along the main scanning direction of the linear image sensor, each of the segments having a different optical density;
   analog-digital conversion means, coupled to the image sensor, for converting outputs from the image sensor into image data;
   memory means, coupled to the analog-digital conversion mans for storing image correction data corresponding to the outputs for each pixel when the sensor is in a position to detect the density indicating segments;
   multiple value image data correcting means for correcting image data obtained by each pixel when the sensor is in a position to detect optical density from the document, the multiple value image data correcting means including
      means for selecting, for each value of the image data, at least two values of the image correction data, and
      means for applying, to each value of the image data, a correction function determined from the selected image correction data values;
   a second density reference area including a plurality of subsidiary density indicating segments arranged along a subsidiary scanning direction of the image sensor, the subsidiary density indicating segments each having a different prescribed optical density and the linear image sensor reading lines form the document and the subsidiary density indicating segments at the same time; and
   wherein the multiple value image data correcting means includes
      first correcting means, including the selecting means and the applying means, for correcting the image data for each pixel at the time of reading the document based on the stored image correction data, thereby forming first corrected image data, and
      second correcting means for correcting the first corrected image data for each line of the document based on image data obtained from reading the subsidiary density indicating segments.

4. The device of claim 3, wherein:
   the linear image sensor includes means for generating subsidiary image correction data values representing the optical density of the subsidiary density indicating segments while reading lines from the document; and
   the second correcting means includes means for applying to each value of the first corrected image data a function determined form at least two of the subsidiary image correction data values.

5. The device of claim 3, wherein:
   the memory means includes means for storing maximum, minimum, and average values for the image data for each pixel.

6. A method of reading images from a document, the images being capable of assuming multiple chromatic values, the method comprising the steps of:

scanning, in a main scanning direction using a linear image sensor having a plurality of pixels arranged along the main scanning direction, at least three density indicating segments arranged along the main scanning direction of the linear image sensor, each of the segments having a different optical density;

storing, as image correction data, optical density values received from the scanning of the density indicating segments;

scanning the document in the main scanning direction using the linear image sensor to produce image data;

correcting image data obtained by scanning the document using the image correction data, the correcting step including the substeps of selecting, for each value of the image data, at least two values of the image correction data, and selectively activating one of a plurality of processing sections to apply one of a plurality of correction functions to a value of the image data, the processing sections each applying one of the plurality of correction functions to a value of the image data, and the processing sections being selectively activated depending on the two selected image correction data values.

7. The method of claim 6, further including the step of storing the values of the image data obtained by each pixel when the sensor is reading images from the document.

8. The method of claim 7, wherein:

the selecting step includes the substep of selecting, for each of the image data values, the two of the image correction data values which are closest to the corresponding image data value, and the applying step includes the substep of determining as the correction function applied by the activated processing section a linear relationship between the two selected image correction data values.

* * * * *

UNITED STATES PATENT AND TRADEMARK OFFICE
CERTIFICATE OF CORRECTION

PATENT NO. : 5,214,518
DATED : May 25, 1993
INVENTOR(S) : Yasuo Kato

It is certified that error appears in the above-indentified patent and that said Letters Patent is hereby corrected as shown below:

Claim 3, column 20, line 19, change "mans" to --means--.

Claim 3, column 20, line 40, change "form" to --from--.

Signed and Sealed this

Fifteenth Day of March, 1994

Attest:

BRUCE LEHMAN

*Attesting Officer*  *Commissioner of Patents and Trademarks*